United States Patent [19]
Davis et al.

[11] Patent Number: 6,021,473
[45] Date of Patent: *Feb. 1, 2000

[54] METHOD AND APPARATUS FOR MAINTAINING COHERENCY FOR DATA TRANSACTION OF CPU AND BUS DEVICE UTILIZING SELECTIVE FLUSHING MECHANISM

[75] Inventors: Barry M. Davis, Phoenix, Ariz.; Nicholas J. Richardson, La Jolla, Calif.; Brian N. Fall, Chandler, Ariz.

[73] Assignee: VLSI Technology, Inc., San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/703,677

[22] Filed: Aug. 27, 1996

(Under 37 CFR 1.47)

[51] Int. Cl.$^7$ .............................. G06F 12/00; G06F 13/00
[52] U.S. Cl. ............................... 711/141; 711/3; 711/118; 711/135; 711/143; 711/147; 711/154
[58] Field of Search ........................ 364/DIG. 1, DIG. 2, 364/240, 243.4, 231.8, 964.342; 711/118, 135, 141, 143, 147, 3, 154; 395/287

[56] References Cited

U.S. PATENT DOCUMENTS

| | | | |
|---|---|---|---|
| 5,097,409 | 3/1992 | Schwartz et al. | 711/118 |
| 5,179,679 | 1/1993 | Shoemaker | 711/100 |
| 5,426,739 | 6/1995 | Lin et al. | 395/325 |
| 5,579,504 | 11/1996 | Callander et al. | 711/144 |
| 5,621,902 | 4/1997 | Cases et al. | 395/309 |
| 5,630,094 | 5/1997 | Hayek et al. | 711/146 |
| 5,664,149 | 9/1997 | Martinez et al. | 711/141 |

OTHER PUBLICATIONS

VLSI Technology, Inc., VL82C535 Device Functional Specification, Document #5–000029, Revision * B, pp. 1–184, Jan. 25, 12996.

PCI Local Bus Specification, Revision 2.1 Product Version, Jun. 1, 1995.

VLSI Technology, Inc., Lynx System Controller Internal Architecture Specification, Document #05–VL82C541–02, Revision #02, pp. 1–259, Aug. 11, 1995.

Ron Wilson, VLSI launches Lynx set for Pentium, Jun. 19, 1995, Electronic Engineering Times a CMP Publications.

VLSI Technology, Inc. Product Bulletin, Lynx Desktop Solution for 586–Class Processors, 1995.

VLSI Technology, Inc. Product Bulletin, MESA Lynx/Anigma Reference Design, 1995.

VLSI Technolgy, Inc. Product Bulletin, Lynx/75 Desktop Solution For 75MHz, 586–Class Processors, 1996.

*Primary Examiner*—Tuan V. Thai
*Attorney, Agent, or Firm*—Martine Penilla & Kim, LLP

[57] ABSTRACT

A method and apparatus for maintaining coherency in CPU and bus device data transactions in a computer system. A CPU may write data items to a memory shared with bus devices and may also write data items to a write buffer in a bridge circuit which are to be sent out on a device bus, such as a PCI bus. When the CPU writes a data item to the shared memory after writing a data item to the write buffer, a dirty bit is set for each location in the write buffer that stores a data item. When a bus device requests access to the shared memory, the dirty bits are checked. If the dirty bits are set, the bus device is denied access to the shared memory to maintain write coherency. When bus device access is denied, the bus device is informed to retry its request at a later time, and data items in the write buffer are flushed to devices on the bus. The write buffer is disabled after flushing the data items so that the CPU cannot write additional data items to the write buffer until the bus device has retried and accessed the shared memory.

20 Claims, 4 Drawing Sheets

METHOD AND APPARATUS FOR MAINTAINING COHERENCY FOR DATA TRANSACTION OF CPU AND BUS DEVICE UTILIZING SELECTIVE FLUSHING MECHANISM

BACKGROUND OF THE INVENTION

The present invention relates generally to computer systems, and more particularly to communication that takes place on a device bus between components in a computer system.

Computer systems utilize internal busses to provide communication between various components of the computer system. For example, in personal computer systems such as IBM-compatible Pentium- or P6-class computers, a main CPU bus is provided to communicate control, data, and address information from the CPU to memory and other components, and vice-versa. Likewise, a device bus is typically provided in personal computers to allow add-on devices, such as video cards or other peripherals, to communicate with the CPU, memory, other add-on devices, and other components of the computer system.

One popular device bus standard is the Peripheral Component Interconnect (PCI) bus by Intel Corporation, which is used by several IBM-compatible personal computers. The PCI bus allows add-on interface cards such as video cards, controller cards, input/output (I/O) cards, modems, sound cards, and other devices to be connected to the computer system and communicate with the CPU, memory, and other components. The PCI bus is a much more efficient bus than previous devices, such as ISA, EISA, and VESA, and can provide a bandwidth of 133 megabytes/sec throughput for fast communication. In addition, fully detailed specifications are provided for the PCI bus as an industry-wide standard to allow device manufacturers to take full advantage of PCI bus capabilities.

The CPU may often communicate with PCI devices such as a video card. In addition, PCI devices may often access components such as memory, which can be shared with other components of the computer system such as the CPU. Since the CPU and PCI devices often process data at different rates, the CPU and PCI devices need to be synchronized. To facilitate fast and efficient synchonization between the PCI devices and the CPU, a write buffer is often implemented.

Figure 1:
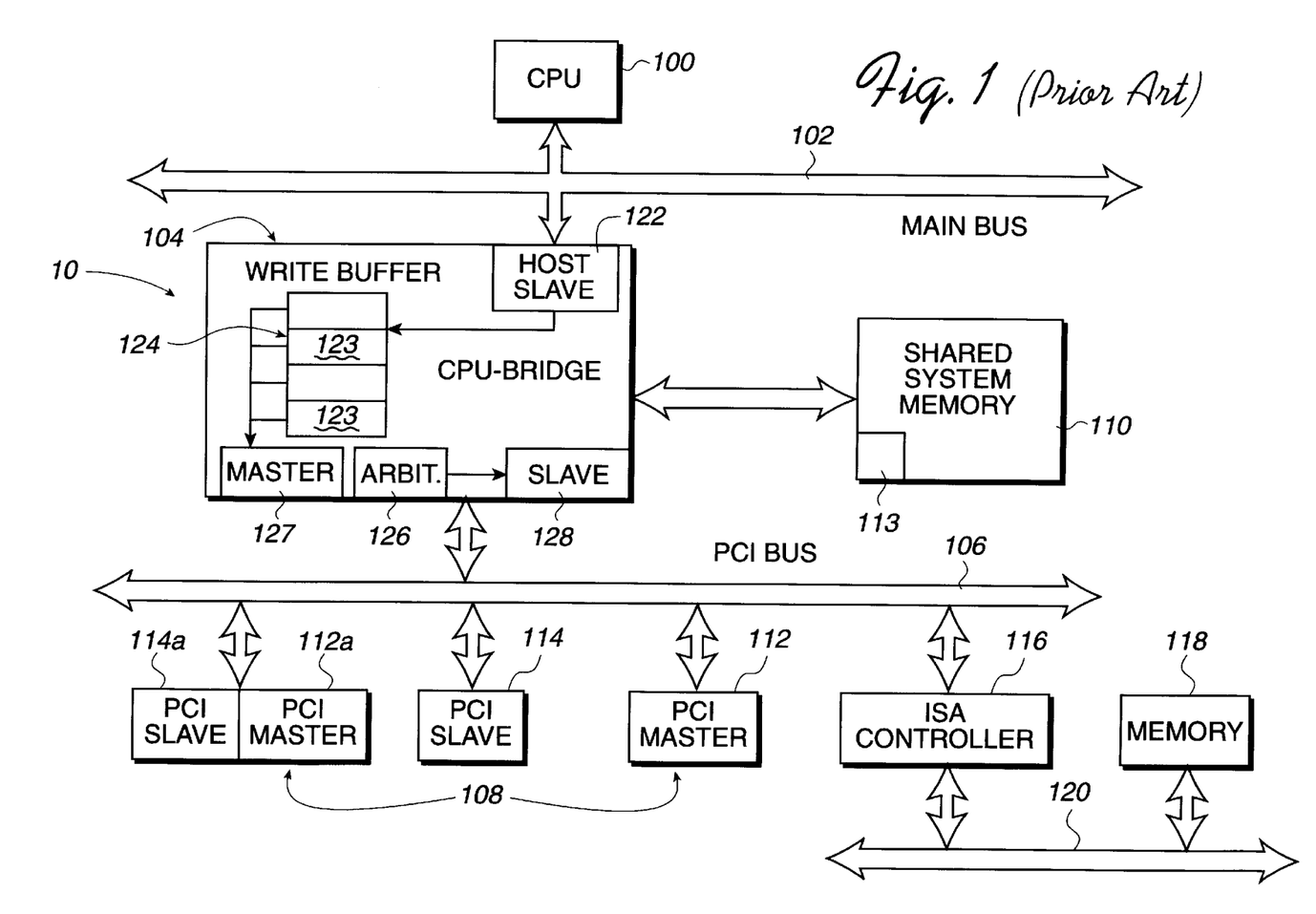
FIG. 1 is a block diagram of a prior art computer system for providing CPU and bus device data transactions.

A typical implementation of a write buffer in a PCI computer system 10 is shown in FIG. 1. CPU 100 is coupled to a main bus 102 and a CPU-PCI bridge 104. The main bus is used for communication between the CPU 100 and other well-known components provided in the computer system (not shown). The CPU-PCI bridge 104 directs the communication of data between the CPU 100 and PCI devices 108 coupled to a PCI bus 106. CPU-PCI bridge 104 is also coupled to devices such as shared system memory 110 to allow both CPU 100 and PCI devices 108 to access memory 110.

PCI devices 108 send and receive data via PCI bus 106 and may include one or more PCI masters 112, PCI slaves 114 and an ISA controller 116. PCI masters 112 are devices that are able to send and receive data from other components in the computer system and gain control of the PCI bus to enable such communication. PCI masters 112 may request data, for example, from shared memory 110 or PCI slaves 114. The PCI slaves 114 are devices that typically store data for retrieval by PCI masters 112 or CPU 100. Often, a PCI master and a PCI slave are both included in a PCI device. For example, a typical PCI device is a video card that may include a PCI master and a PCI slave. The PCI master portion of the video card requests data from video memory on the card and data from shared memory 110 which was stored by the CPU 100. The PCI slave portion of the card allows other PCI masters to gain access to the video memory on the video card. PCI master 112a and PCI slave 114a, shown in FIG. 1, illustrate such a configuration.

ISA controller 116 can also be provided as a PCI device (e.g., having both a master and slave in the same device) in the system 10 to allow compatibility with ISA devices. ISA controller 116 acts as a bridge between the PCI bus 106 and an ISA bus 120. Other components, such as memory 118, can be coupled to the ISA bus and accessible via the ISA bus. Since ISA bus devices are still widely available, many systems include an ISA controller 116.

CPU-PCI bridge 104 facilitates more efficient communication between the PCI bus and other components and includes a host slave 122, a write buffer 124, an arbiter 126, a bridge PCI master 127, and a bridge PCI slave 128. Host slave 122 decodes all data from the CPU 100 so that the data can be routed to the proper destination. The host slave 122 temporarily stores data that is to be sent to PCI devices 108 into locations 123 in write buffer 124 until the data can be sent to the PCI devices. Since the data transfer rates of PCI devices 108 and CPU 100 are typically different, the temporary storage of data frees up the CPU for other communications, thus providing a much faster implementation than if no write buffer 124 were used. The data in the write buffer 124 is sent out to PCI devices when synchronization permits by bridge PCI master 127, which gains control of the PCI bus and "flushes" the write buffer. If the write buffer becomes full, the CPU is delayed from writing to the write buffer until a location in the write buffer becomes available. When data is sent out on the PCI bus, all PCI devices 108 see the data. Since the data includes an identification of the PCI device that the data is intended for, the correct PCI device 108 will respond and receive the data. In addition, arbiter 126 arbitrates PCI bus access requests from the CPU 100 and PCI devices 108. Bridge slave 128 allows the CPU-PCI bridge 104 to function as a slave when a PCI master 112 attempts to access shared memory 110.

A problem with the bus configuration disclosed in FIG. 1 occurs with respect to write coherency. The term "coherency", as used herein, refers to the order of data written to the various devices, which is important to maintain so that the correct data is received at the proper destinations. When the CPU writes data into shared memory 110, there is the possibility that the ordering of written data will not be maintained. For example, the CPU first writes data into a location 123 of write buffer 124, where the data is intended to be provided to PCI master 112a. The CPU then writes different data into a location 113 of shared memory 110. Next, PCI master 112a attempts to read the data from location 113 of shared memory 110. However, PCI master 112a was intended by the CPU to receive the data stored in location 123 of write buffer 124 before the PCI master accessed the shared memory 110, e.g., the data in location 123 may have changed its condition or value for the PCI master if PCI master 112a accesses shared memory first. Thus, the coherency or "strong write ordering" of the CPU has been violated in this example when PCI master 112a is allowed to access the shared memory data before the write buffer data.

In another example, the CPU writes data in write buffer 124 that is intended for a PCI slave 114. The CPU then sets data such as a flag in location 113 in shared memory 110 to indicate completion of that write operation. A PCI master 112 then gains control of the PCI bus 106 before the data in the write buffer 124 is flushed to PCI slave 114. If the PCI master 112 is allowed to access shared memory 110, the PCI master will see the state of flag 113 and get a false indication of the state of the memory locations in PCI slave 114.

To compensate for this problem, prior art devices "flush" the write buffer before each time the PCI master is allowed to access the shared memory 110. The flushing procedure entails refusing shared memory access to the PCI master and regaining control of the PCI bus. All data in write buffer 124 is then automatically sent out to the PCI bus to any intended PCI devices. The PCI master must then "retry" its request to gain access to shared memory. This process makes sure that PCI devices 108 always receive their intended data from write buffer 124 before a PCI master may access shared memory 110, and maintains the intended write ordering.

This prior art automatic flushing technique is effective at reducing coherency problems with the bus system 10. However, it is very inefficient. All the data in the write buffer is indiscriminately flushed whenever a PCI master accesses the main memory, whether or not the data actually needs to be flushed. The data may not need to be flushed, however, if the CPU has not written or changed any data in the shared memory, or if the CPU has not previously written to write buffer 124. The prior art technique thus can cause significant and unnecessary delays in data transactions, since the PCI bus must be reserved to flush all the write buffer data before a PCI master can access the shared memory through the PCI bus, and the PCI master must retry to gain access to shared memory. These delays can even become more significant for applications such as multimedia, in which the CPU streams write data to a graphics frame buffer simultaneously with a PCI master streaming read data from DRAM, since transactions often have to be retried and the write buffer has to be disabled.

What is needed therefore is a method and apparatus that makes more efficent use of a device bus, such as the PCI bus, during memory accesses while maintaining the coherency of previous memory writes.

SUMMARY OF THE INVENTION

A method and apparatus of the present invention allows coherency to be maintained for CPU and bus device data transactions in a computer system. A bus device is not allowed access to a shared memory when there is a possibility of violating the write ordering of data items by the CPU. Efficiency in the system is promoted by flushing data items to bus devices only when actually required, and not every time a PCI device accesses a shared memory as in the prior art.

More specifically, a preferred computer apparatus for maintaining coherency for data transactions of a CPU and bus device in accordance with the present invention includes a central processing unit (CPU) and a shared memory, such as DRAM, coupled to and accessible by the CPU. A bus device receives data items from the CPU over a device bus and accesses the shared memory over the device bus. A bridge circuit is coupled between the CPU and the device bus and provides the data items from the CPU to the device bus. The bridge circuit includes a write buffer for temporarily storing the data items from the CPU before sending the data items to the bus device, and a dirty bit location for storing a dirty bit. The dirty bit is set when the CPU writes to the shared memory after having written a data item to the write buffer.

The embodiments disclosed herein are suitable for a PCI device bus and similar bus standards. The write buffer preferably includes multiple data locations for storing the data items, and the bridge circuit preferably includes multiple dirty bit locations corresponding to the multiple data locations, where each dirty bit location may store a dirty bit for the associated data location if the data location is "valid", i.e., holds a data item. The bridge circuit also includes a host slave for decoding commands from said CPU and for setting said dirty bits, a bridge master for sending data from the write buffer to PCI devices, and an arbiter for arbitrating bus access requests from said PCI device. A bridge slave is also included in the bridge circuit for receiving an indication if any dirty bits are set, such that when said PCI device requests access to the shared memory, the bridge slave informs the PCI device to retry the request if any of the dirty bits are set.

A method of the present invention for maintaining coherency in a computer system having CPU and device bus data transactions includes a step of receiving a request from a bus device via a device bus for access to a shared memory. A first data item is stored in a write buffer and is intended for the device bus, and a second data item is stored in the shared memory. The bus device is denied access to the shared memory only when a CPU write ordering of the first data item and the second data item would be violated by allowing the access, such as when the CPU has written a first data item to the write buffer and a second data item to the shared memory after writing the first data item. When the access of the bus device to the shared memory is denied, the bus device is informed to retry the request at a later time, and the first data item in the write buffer is flushed to the bus device to maintain coherency.

Preferably, the write buffer includes multiple data locations for storing the first data item and is included in a bridge circuit provided between the device bus and the CPU. A dirty bit is associated with each of the data locations in the write buffer. A dirty bit that is associated with a data location that stores the first data item is set after the CPU writes the second data item. The bus is denied access to the shared memory when any of the dirty bits are set and the bus device is informed to retry its request later, at which time the retrying bus device is allowed to access the shared memory if none of the dirty bits are set. Preferably, the write buffer is disabled after flushing the first data item so that the CPU cannot write additional data items to the write buffer, and is enabled when the retrying bus device accesses the shared memory. In an alternate embodiment, a write-back cache of the CPU is checked on every access that is made from a bus device to shared memory. If the cache stores the most recent data, that data is written from the CPU to shared memory, which will in turn set the dirty bits of any valid locations in the write buffer.

The method and apparatus of the present invention maintains coherency of written data items in an efficient manner. The data items in the write buffer are flushed to a bus device before allowing the bus device access to shared memory only when the CPU has previously written data to the shared memory after the data items were written. Thus, the write buffer is not needlessly flushed and disabled when the CPU has previously read from shared memory, or when the CPU has not written to the write buffer before writing to shared memory, thereby decreasing unnecessary delays in data transactions of the CPU and bus devices. This also decreases the inefficiency of needlessly causing PCI masters to constantly retry requests for memory accesses. Furthermore, the dirty bits of the present invention allow a bridge circuit to easily determine whether the write buffer should be flushed. In addition, the present invention instructs a bus device to retry its request for access to the shared memory, further promoting efficient use of the data bus and speeding data transactions.

These and other advantages of the present invention will become apparent to those skilled in the art upon a reading of the following specification of the invention and a study of the several figures of the drawing.

DETAILED DESCRIPTION OF THE PREFERRED EMBODIMENT

Figure 2:
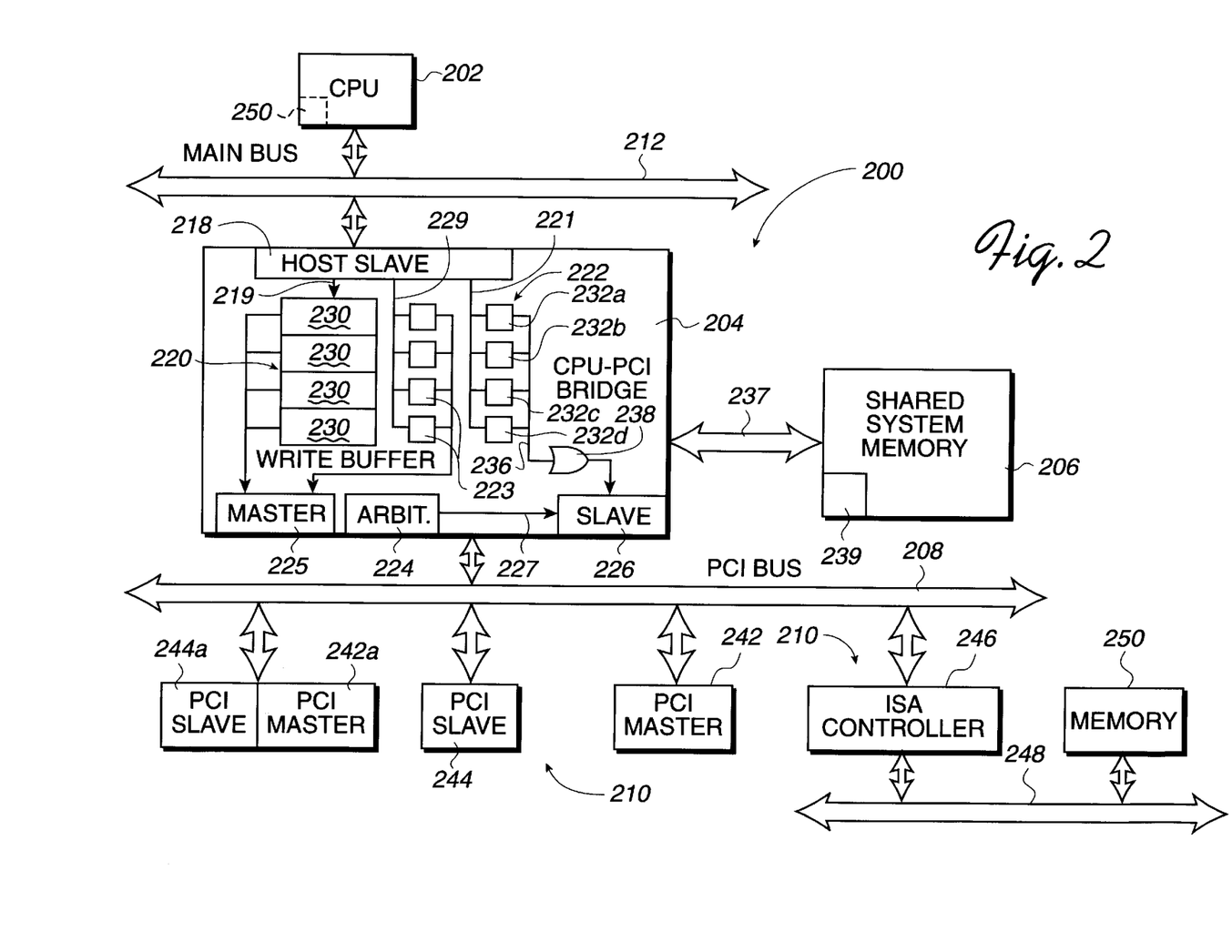
FIG. 2 is a block diagram of a computer system of the present invention for providing CPU and bus device data transactions.

As shown in FIG. 2, a computer system 200 in accordance with the present invention includes a central processing unit (CPU) 202, a CPU-PCI bridge 204, shared system memory (or "shared memory") 206, a PCI bus 208, and PCI devices 210.

CPU 202 is preferably included in one or more microprocessors such as a commercially available, single chip microprocessor. For example, a suitable microprocessor is one of the Pentium or P6 family of microprocessors manufactured by Intel Corporation. CPU 202 is coupled to a main bus 212 by a data/control/address bus 214. Main bus 212 communicates data between CPU 202 and other components in computer system 200. For example, CPU can access a cache memory and read only memory (ROM) (not shown) of computer system 200 using main bus 212.

CPU-PCI bridge 204 is coupled to CPU 202 by main bus 212. CPU-PCI bridge 204 preferably is an integrated circuit or chip set including circuitry for several functional components. These components include a host slave 218, write buffer 220, dirty bits 222, arbiter 224, bridge master 225, and bridge slave 226. For example, the CPU-PCI bridge can include one or more application-specific integrated circuits (ASICs) as well as other components such as registers, etc., well known to those skilled in the art for implementing functions in a circuit.

Host slave 218 decodes signals sent from the CPU 202 to the CPU-PCI bridge 204 and determines where to send or retrieve data items. A "data item" can be any form of data that is to be stored in memory or a buffer; for example, a data item can be input or output data, PCI configuration registers, etc. The host slave can receive a command from the CPU to write a data item into a designated memory (e.g., a memory write command), which would be accompanied by the data item to be written and a memory address at which to write the data item in memory. The host slave can also receive a command from the CPU to read a data item from a memory location in a memory (e.g., a memory read command), which would be accompanied by a memory address at which to read the data item from memory. Other commands can also be provided from the CPU (e.g., using additional control lines) and included with data items and addresses as appropriate.

If the CPU has sent a write command, the host slave determines whether the data item is to be written to shared memory 206 or to a PCI device 210. The host slave 218 checks whether the address sent by the CPU is included in shared memory 206. If so, the host slave 218 decodes the write command and writes the data in the appropriate memory location in shared memory 206. In addition, the host slave 218 sends a signal on bus 219 to write buffer 220 indicating that a data item has been written to shared memory 206 by the CPU 202.

Furthermore, after determining that a data item has been written to shared memory 206, host slave 218 checks which of the data locations of write buffer 220 are "valid", i.e., have a data item stored therein. The host slave of the present invention then uses line 221 to set the dirty bits 222 associated with those data locations that are valid, as explained below.

If the data item that is sent by the CPU with the write command is not to be written to a location in shared memory 206, the host slave 218 assumes the data item is to be written to PCI bus 208. The host slave thus stores the data item in a data location 230 of write buffer 220 via bus 219. If the write buffer is currently full, then the CPU is held off (stalled) until a location in the write buffer 220 is freed and the data item can be written.

Write buffer 220 is included in CPU-PCI bridge 204 to temporarily store data items that are to be sent out on PCI bus 208. Write buffer 220 includes a number of data locations 230, each location for storing a data item and a memory address for the data item. Each data location 230 includes a number of bit locations for storing bits of the data items and addresses. In FIG. 2, four data locations 230 are shown, but any number can be provided depending on desired size and available memory capacity. The data locations 230 may have a predetermined depth as appropriate to the type of data stored, such as 32 bits (a word).

Due to synchonization and arbitration overhead, the transactions between the CPU and the PCI bus are made much more efficient through the use of write buffer 220. For example, after the CPU writes data items to write buffer 220 that are to be sent over the PCI bus 208, the CPU is free to perform other tasks such as writing or reading data from shared memory 206, i.e., the CPU's data can be temporarily stored in the write buffer 220 until the PCI bus is free from other data transactions so that the CPU does not have to wait for the bus 208 to become free. Once the data is written to write buffer 220, the CPU-PCI bridge 204 is responsible for flushing the data items in the write buffer to the PCI bus. Flushing data to a PCI bus is well known to those skilled in the art, and is described in greater detail in the PCI Local Bus Specification, Revision 2.1, published by the PCI Special Interest Group and Intel Corporation, and which is hereby incorporated by reference herein.

Dirty bits 222 are additional bits of the present invention that are provided by CPU-PCI bridge circuitry and which are each associated with a data location 230 of write buffer 220. For example, if there are four data locations 230 in write buffer 220, there are four dirty bits 222. Each dirty bit location 232a, 232b, 232c, and 232d is provided in memory of the CPU-PCI bridge 204 and may store a dirty bit that is either set (e.g., a "1" value) or cleared (e.g., a "0" value). Host slave 218 may set or clear the dirty bits 222 using control lines 221. The dirty bit values are also accessible to bridge slave 226 on lines 236 and through an OR gate 238 coupled between the dirty bits and the bridge slave. The OR gate 238 provides a signal to slave 226 indicating when any one or more of dirty bits 222 are set.

Figure 3A:
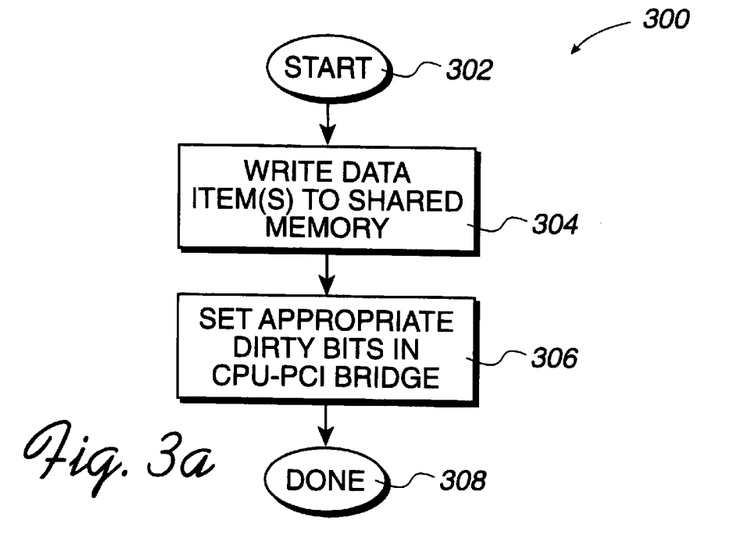
FIG. 3a is a flow diagram illustrating a method of the present invention that occurs when the CPU writes data items to or modifies data in shared memory.
Figure 3B:
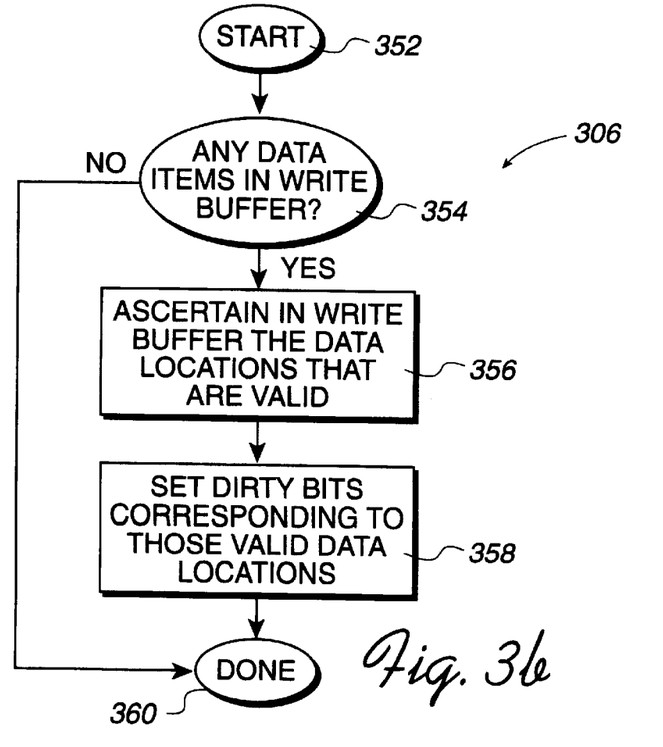
FIG. 3b is a flow diagram illustrating a step of the method of FIG. 3a for setting dirty bits of the present invention.

The dirty bits 222 are used in the present invention to indicate when the data in write buffer 220 should be flushed. The dirty bits associated with valid data locations 230 are set when CPU 202 writes to shared memory 206. If the dirty bits were previously set when a PCI master wishes to access shared memory 206, the write buffer 220 is flushed before the PCI master is allowed access to the shared memory 206. This process is described in greater detail with respect to FIG. 3.

Status bits 223 are additional bits provided in memory of CPU-PCI bridge 204 for data locations 230 in the write buffer 220. When a data item is stored in a particular data location 230 in the write buffer 220, a status bit 223 that is associated with the particular location is set (e.g., to a "1" value) to indicate that the data location is storing a data item. When the write buffer is flushed, as described below, the status bits 223 are cleared. The status bits may be set or cleared using control lines 229.

Arbiter 224 is included in CPU-PCI bridge 204 to arbitrate bus access requests for the PCI bus 208. For example, a PCI master may request use of the PCI bus 208 to communicate with another PCI device 210 or shared memory 206. The arbiter determines when the PCI master may gain control of the PCI bus for its use, as is well known to those skilled in the art Likewise, the arbiter determines controls the CPU access to the PCI bus when the CPU requests to communicate with a PCI master 242 or slave 244.

Bridge master 225 is included in CPU-PCI bridge 204 to allow the bridge 204 to act as a PCI master. For example, bridge master 225 can take control of the PCI bus and send data from the write buffer 220 out to the PCI bus 208, where the data is received by the appropriate PCI device 242 or 244.

Bridge slave 226 is included in CPU-PCI bridge 204 to allow the bridge 204 to act as a PCI slave when receiving requests from a PCI master coupled to PCI bus 208. For example, slave 226 can receive a request on PCI bus 208 from a PCI master 242 to access shared memory 206. The PCI master 242 accesses the shared memory 206 by accessing this PCI slave in the CPU-PCI bridge. Bridge slave 226 also receives a dirty bit indication from OR gate 238 which tells the slave 226 that a CPU write operation to shared memory 206 has occurred. Thus, the slave 226 can inform a PCI master 242 to retry accessing the shared memory 206 at a later time, and to tell the CPU-PCI bridge to flush the data items in the write buffer 220 to maintain coherency. The host slave 218 disables the write buffer 220 at this time, to prevent the CPU 202 from storing additional data items in the write buffer, until the PCI master 242 can access shared memory when it retries. This procedure is described in greater detail with respect to FIG. 4.

Shared memory 206 is coupled to CPU-PCI bridge 204 by a bus 237. Shared memory can be any suitable memory device that may have data items written to it and read from it. For example, dynamic random access memory (DRAM) is often used in personal computer systems to act as shared memory 206. Shared memory 206 includes a number of data memory locations, such as memory location 239, to which data items may be written and from which data items may retrieved. For example, data items such as input data, output data, a flag, or other memory addresses can be stored. For instance, a flag data item in location 239 can be set by the CPU 202 to indicate when CPU has finished writing data to shared memory 206. The flag indicates to later devices, such as a PCI master, that the CPU has completed its write operation and the written data may be accessed. Herein, when the CPU "writes a data item" to shared memory 206, this term can also refer to the CPU 202 setting or clearing a flag as well as other types of data items. In addition, there may be one or more additional write buffers (not shown) provided between CPU 202 and shared memory 206 for temporarily storing written data items, as is well known to those skilled in the art.

PCI bus 208 is coupled to CPU-PCI bridge 204. The PCI bus is a standard bus having well-known functions and capabilities. The PCI Bus Specification, Revision 2.1, describes the pertinent features, operation, and structure of the PCI bus, and is hereby incorporated by reference herein. In other embodiments of the present invention, other types of device buses can be used which can be operated similarly to the PCI bus 208.

PCI devices 210 are coupled to PCI bus 208 and communicate with shared memory 206 and other PCI devices 210. PCI devices 210 include PCI masters 242 and PCI slaves 244. PCI masters 242 retrieve data from and send data to PCI slaves 244 via the PCI bus 208. When retrieving data from shared memory 206, PCI masters 242 retrieve data from slave 226 in the same fashion as retrieving data from PCI slaves 242. In one implementation, each PCI master has a single PCI request line that is coupled via the PCI bus to the PCI arbiter. The PCI master pulls this line active when it wants to gain control of the PCI bus. The arbiter in turn returns a single PCI signal to the PCI master that grants the PCI bus to the PCI master. One example of a PCI device 210 including both PCI master 242a and PCI slave 244a is a video card. PCI master 242a requests data from the shared memory 206, which was stored in the memory by the CPU 100, or from the video memory of the video card. The PCI slave portion of the card allows other PCI masters to gain access to the video memory of the video card.

Other PCI devices can include ISA controller 246, which can be coupled to PCI bus 208 to provide communication between PCI devices 210 and other devices connected to an ISA bus 118 as found in many IBM PC-compatible computer systems. For example, memory 250 can be coupled to the ISA bus 248. ISA bus 248 and ISA controller 246 are useful for maintaining compatibility with the wide variety of existing ISA devices that can be connected to the ISA bus 248.

Computer system 200 can also include a number of other components not shown in FIG. 2 and which are coupled through PCI devices 210 or other connections. Such peripherals can include storage units such as a disk drive unit or nonvolatile memory such as flash memory, a display screen, modem, printer, network interface, CD-ROM drive, etc.

In an alternate embodiment of the present invention, the dirty bits 222 can be used to maintain coherency in a system having a CPU with an internal "write-back" cache 250. A write-back cache stores addresses that the CPU has written and can be implemented as a subset of shared memory 206, i.e., the addresses of the cache duplicate some of the addresses of the shared memory. The cache is allocated by the CPU and is used by the CPU to increase the speed of memory transfers. Since the cache is internal to the CPU, the CPU can access the cache much faster than the shared memory. The addresses stay local to the CPU in the cache 250 unless the CPU decides it does not need to store the address locally any longer, the CPU needs the cache to store other data, or another device needs access to the written addresses. If any of these conditions apply, the CPU flushes the addresses in the cache 250 to shared memory 206. In the present invention, the CPU-PCI bridge 204 "snoops" the cache 250, i.e., the bridge checks the cache to determine whether the cache contains a memory address that matches the memory address that a PCI master 242 is trying to read from shared memory 206. If there is a match, and the cache data has been flushed to shared memory by the CPU, then dirty bits for valid data locations 230 are set similarly to the non-cache embodiment. The PCI master 242 is then denied the data item it has accessed from shared memory 206, the write buffer 220 is flushed to the PCI bus, and the PCI master must retry at a later time, as described in the embodiment above and with reference to FIG. 4.

Operations of a CPU-PCI bridge and related functions are described in the Lynx System Controller Internal Architecture Specification, VLSI Technology, Inc., 1995, which is hereby incorporated by reference herein.

FIG. 3a is a flow diagram illustrating a process 300 of the present invention of CPU 202 writing to shared memory 206. The CPU may or may not have previously written data items to write buffer 220. The process begins at 302, and in step 304, the CPU writes one or more data items to the shared memory 206. This is typically accomplished by writing to one or more shared memory write buffers provided between CPU 202 and shared memory 206 whose contents are frequently updated to shared memory as is well known to those skilled in the art. The written data item can be a flag that is set or other types of data items, as described above. In next step 306, the host slave 218 sets the appropriate dirty bits 222 in CPU-PCI bridge 204 for any valid data locations of the write buffer 224. This step is described in greater detail with respect to FIG. 3b. The process is then complete at 308.

FIG. 3b is a flow diagram illustrating step 306 of FIG. 3a, in which appropriate dirty bits are set at the occurrence of a CPU write operation to shared memory 206. The process begins at 352, and, in step 354, the CPU-PCI bridge circuitry determines whether there are any data items currently stored in the write buffer 220. This can be accomplished, for example, by checking whether any of the status bits 223 are set. If not, the process is complete at 360. If so, these data items in the write buffer are intended for PCI devices 210 coupled to the PCI bus 208, and the strong write ordering of the data items must be maintained. Therefore, the process continues to step 356, in which circuity in the CPU-PCI bridge ascertains which data locations 230 in the write buffer are valid, which is known from the values of the status bits 223 (appropriate status bits are set when data items are stored in the write buffer). As explained above, valid data locations are those data locations in write buffer 220 which currently store a data item. Once it is determined which data locations are valid, step 358 is performed, in which the host slave 118 sets the dirty bits corresponding to the valid data locations determined in step 356. Depending on how many data items are currently stored in the write buffer 220, some or all of the dirty bits may be set at this step. The process is then complete at 360.

Figure 4:
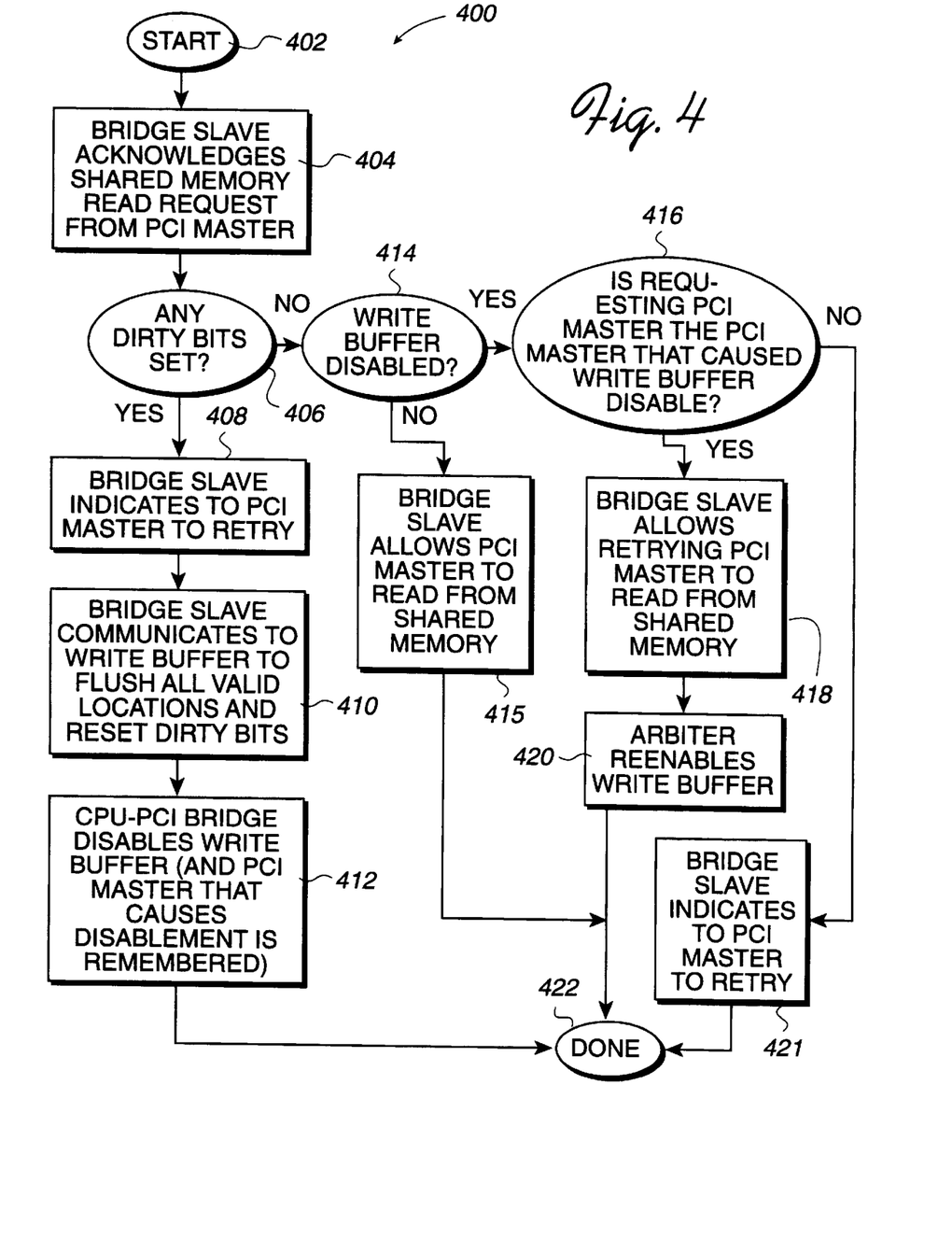
FIG. 4 is a flow diagram illustrating the method of the present invention of handling a request by a PCI master to access shared memory.

FIG. 4 is a flow diagram illustrating a process 400 of the present invention for implementing a PCI master 242 access to shared memory 206 while maintaining coherency. The process begins at 402. At step 404, bridge slave 206 in CPU-PCI bridge 204 acknowledges a read request from a requesting PCI master 242 to read one or more data items from shared memory 206. This is implemented according to standard methods well known to those skilled in the art. It should be noted that if no PCI masters try to access shared memory 206, the write buffer 220 is flushed by bridge master 225 in the normal write order when transactions on the PCI bus permit it, and the dirty bits are reset when the data is flushed in this way.

In next step 406, bridge slave 226 checks whether any of dirty bits 222 are set. This is checked by reading a signal from OR gate 238 (shown in FIG. 2) that indicates of any of locations 232a–d have a dirty bit set. If any dirty bits are set, the process continues to step 408, where the bridge slave 226 indicates to the requesting PCI master 242 to retry the request to access shared memory 206. A "retry" is a particular action that is implemented on the PCI bus standard and which tells PCI master 242 to wait and request access to shared memory 206 again at a later time. Since the set dirty bits indicate that the CPU has written to shared memory 206 after writing to write buffer 220, the PCI master 242 should not be allowed to access shared memory 206 before receiving any data items in the write buffer. Accordingly, in next step 410, the bridge slave 226 communicates to write buffer 220 (and bridge master 225) to flush all valid locations and reset the dirty bits 222. Only the valid data locations 230 are preferably flushed. In an alternate embodiment, all the locations 230 of the write buffer can be automatically flushed if any of the dirty bits are set. The dirty bits are reset to indicate that data items are no longer stored in the write buffer.

In step 412, the CPU-PCI bridge disables the write buffer 220 from storing any additional data and remembers the particular requesting PCI master that must retry its access to the shared memory 206. For example, the retrying PCI master is identified by examining the PCI request lines, described above. The write buffer 220 is disabled to prevent the possible scenario that PCI master 242 will endlessly retry to access the shared memory. For example, if write buffer 220 were not disabled, CPU 202 could write additional data items into data locations 230 of write buffer 220 while the PCI master is waiting to retry. Thus, the dirty bits would again be set and, when the PCI master retried its original request, it would have to again retry its request due to the new dirty bits that were set. After the write buffer is disabled in step 412, the process is complete at 422. Later, if PCI master 242 must retry to access shared memory 206, process 400 is begun again from step 402.

If no dirty bits are set when they are checked in step 406, then the process continues to step 414, where the process checks if the write buffer is currently disabled from a previous request by a PCI master 242. If the write buffer is not disabled, the bridge slave 226 allows the requesting PCI master to read data items from shared memory 206 in step 415, and the process is then complete at 422. If the write buffer is disabled in step 414, the process continues to step 416, where the arbiter 224 checks whether the requesting PCI master is the particular PCI master that caused the write buffer to be disabled, i.e., whether the requesting PCI master is "retrying" to access shared memory 206 after being denied (this retrying PCI master was remembered in step 412). The arbiter only allows this retrying PCI master to access shared memory while the write buffer is disabled. Thus, if the requesting PCI master is not the retrying PCI master, then the write buffer should not yet be enabled, since the endless request scenario might still occur as explained above. Accordingly, after a negative result from step 416, step 421 is performed, where the bridge slave denies access to the shared memory and indicates to the requesting PCI master to retry, and the process is complete at 422. If, at step 416, the requesting PCI master is the retrying PCI master that caused the buffer disable, then, in step 418, the bridge slave allows the retrying PCI master to read from shared memory. After step 418, the arbiter reenables the write buffer 220 in step 420 by using line 227 coupled to bridge slave 226, thus allowing the CPU 202 to again write data items to the write buffer and allowing other PCI masters to access shared memory. The process is then complete at 422.

In the alternate embodiment having a CPU with an internal write-back cache 250, the process would be implemented substantially the same. The PCI-CPU bridge 204 would check the write-back cache 250 of the CPU 202 before the PCI master 242 accesses the shared memory 206 in step 414. If the CPU-PCI bridge finds an address in the cache that matches the address that the PCI master wishes to access in shared memory, then dirty bits are set and the PCI master is denied its access to the shared memory as in steps 408–412, where the bridge slave 226 informs the PCI master to retry its request for access to shared memory 206 and the write buffer is flushed.

The described coherency problem only occurs when the CPU writes data items to shared memory 206 after having written data items to write buffer 220. Thus, if the CPU reads from shared memory 206, or if the CPU does not write data to the write buffer 220 before writing to shared memory 206, then there is no coherency problem. The present invention allows data transactions for the CPU and PCI devices to be much more efficient by refusing a PCI master access and flushing the write buffer only when the coherency problem exists.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit the present invention. It is therefore intended that the following appended claims include all such alterations, modifications and permutations as fall within the true spirit and scope of the present invention.

What is claimed is:

1. A computer apparatus for maintaining coherency for data transactions of a processor and plurality of bus devices, the computer apparatus comprising:

a central processing unit (CPU);

a shared memory coupled to and accessible by said CPU;

at least a bus device for receiving data items from said CPU over a device bus and for accessing said shared memory over said device bus;

bridge circuit coupled between said CPU and said device bus for providing said data items from said CPU to said device bus, said bridge circuit including:

a host slave for receiving a write command and said data items from said CPU for determining whether said data item is to be written to said shared memory or to said bus device;

a write buffer coupled to said host slave for temporarily storing data items from said CPU before sending said data items to said bus device;

a status bit location associated with said write buffer and being coupled to said host slave for storing a status bit, wherein the host slave sets the status bit to indicate that the write buffer is storing a data item, the status bit being cleared when the write buffer is flushed;

a bridge master coupled to receive said data item and said associated status bit from said write buffer and said status bit location, respectively, said bridge master being adapted to send said data item from the write buffer to said bus device through said device bus;

plurality of dirty bit locations which correspond to each data location within said write buffer, coupled to said host slave for storing a dirty bit, said dirty bit being set when said CPU writes a second data item to said shared memory after having written a first data item to said write buffer, wherein only selective of said second data item in said write buffer is flushed to said device bus in response to said dirty bit when said bus device requests access to said shared memory;

an arbiter circuit coupled to a bridge slave for arbitrating bus access requests from said plurality of bus devices and said CPU; and a four-input logical-OR gate coupled between said plurality of dirty bit locations and said bridge slave for providing a signal to said bridge slave indicating when any one or more of dirty bits are set, wherein said bridge slave coupled to said plurality of dirty bit locations to receive said dirty bit, the bridge slave for receiving an indication if any dirty bits are set such that when said bus device requests access to said shared memory, said bridge slave informs said bus device to retry said request if any of said dirty bits are set.

2. A computer apparatus as recited in claim 1 wherein said device bus is a PCI bus, and wherein said bus device is a PCI device.

3. A computer apparatus as recited in claim 2 wherein said write buffer includes a plurality of data locations for storing said data items, and wherein said bridge circuit includes said plurality of dirty locations corresponding to said plurality of data locations, each dirty bit location storing a dirty bit for an associated data location.

4. A computer apparatus as recited in claim 3 wherein said bridge circuit further includes a host slave for decoding commands from said CPU and for setting said dirty bits at said data locations that store a data item from said CPU.

5. A computer apparatus as recited in claim 3 wherein said PCI device is a PCI master device operative to communicate data over said PCI bus, and further comprising a plurality of PCI master devices coupled to said PCI bus.

6. A computer apparatus as recited in claim 3 wherein said shared memory includes dynamic random access memory (DRAM).

7. A computer apparatus as recited in claim 4 further comprising an ISA controller and an ISA bus for allowing ISA devices to communicate with said CPU and said PCI device.

8. A computer apparatus as recited in claim 4 wherein said CPU includes a write-back cache for storing said data items written by said CPU, wherein said bridge circuit checks said write-back cache before allowing said PCI device to access said shared memory and wherein said dirty bits are set when said data item in said write-back cache is an address that matches a memory location from said shared memory that said PCI device is attempting to access.

9. A method for maintaining coherency in a computer system having CPU, plurality of bus master devices and PCI bus data transactions, the method comprising:

receiving plurality of bus access requests via a device bus from said plurality of bus master devices for access to a shared memory;

arbitrating said plurality of bus access requests from said plurality of bus master devices and said CPU;

denying a bus master device from accessing to said shared memory if a CPU write ordering of a first data item and a second data item would be violated by allowing said access, wherein said first data item is stored in a write buffer and is intended for said device bus, and wherein said second data item is stored in said shared memory, wherein said write buffer includes data locations for storing said first data item and further comprising a dirty bit associated with each of said data locations;

setting said dirty bit associated with said data location that stores said first data item after said CPU writes said second data item;

receiving an indication if any dirty bits are set through a four-input logical-OR gate that coupled to a bridge slave when said bus master device requests access to said shared memory;

informing said bus master device to retry said request at a later time if any of said dirty bits are set;

providing said first data item in said write buffer to said bus master device when informed of the retry by said bridge slave;

selectively flushing only said first data item in said write buffer to said device bus in response to said dirty bit when said bus master device requests access to said shared memory, and if said CPU has written said second data item to said shared memory after writing said first data item to said write buffer.

10. A method as recited in claim 9 wherein said write ordering of said first data item and said second data item is violated if said CPU has written said second data item to said shared memory after writing said first data item to said write buffer.

11. A method as recited in claim 9 further comprising disabling said write buffer after flushing said first data item such that said CPU cannot write additional data items to said write buffer.

12. A method as recited in claim 11 further comprising receiving a retry request from said bus master device and allowing said bus master device to access said shared memory if none of said dirty bits are set.

13. A method as recited in claim 12 wherein said retrying bus master device is one of said plurality of bus master devices coupled to said device bus, wherein when said write buffer is disabled, said plurality of bus master devices other than said retrying bus master device may not access shared memory, and wherein said write buffer is disabled until said retrying bus master device tries to access said shared memory, at which time said write buffer is enabled.

14. A method as recited in claim 9 wherein said bus is a PCI bus, and wherein said bus master device is a PCI device.

15. A method for maintaining coherency in a computer system having CPU, plurality of bus master devices and device bus data transactions, the method comprising:

receiving plurality of bus access requests from said plurality of bus master devices via a bus for access to a shared memory;

determining whether said CPU has written a first data item to a write buffer and a second data item to said shared memory after writing said first data item, wherein said first data item is to be sent from said write buffer to a bus master device, wherein said write buffer includes a plurality of data locations for storing said first data item and is included in a bridge circuit provided between said bus and said CPU, and wherein said bridge circuit further comprises a dirty bit associated with each of said data locations, such that a particular dirty bit is set when said CPU writes said second data item to said shared memory after writing said first data item;

providing said first data item on said write buffer to maid bus master device when informed of a retry;

selective flushing only certain said first data item in said write buffer on said bus before allowing said bus master device to access said shared memory if said CPU has written said second data item to said shared memory after writing said first data item to said write buffer;

receiving an indication if any dirty bits art set through a four-input logical-OR gate that coupled to a bridge slave when said bus master device requests access to said shared memory;

refusing said request from said bus master device from accessing said shared memory when said CPU is determined to have written said second data item to said shared memory after writing said first data item, wherein said refusing step of further includes informing said bus master device to retry said request at a later time, and informing said bus master device to retry said request when acknowledging of said indication of any of said dirty bits are set.

16. A method as recited in claim 15 wherein said flushing includes flushing only the data items in said write buffer which have dirty bits set.

17. A method as recited in claim 15 further comprising disabling said write buffer after flushing said first data item such that said CPU cannot write additional data items to said write buffer.

18. A method as recited in claim 17 further comprising receiving a retry request from said bus master device, and allowing said retrying bus master device to access said shared memory when none of said dirty bits are set.

19. A method as recited in claim 15 wherein said write buffer is disabled until said bus master device may access said shared memory, at which time said write buffer is enabled.

20. A method as recited in claim 15 wherein said bus is a PCI bus, and wherein said bus master device is a PCI device.

* * * * *